US011084591B2

(12) United States Patent
Knight et al.

(10) Patent No.: US 11,084,591 B2
(45) Date of Patent: Aug. 10, 2021

(54) AIRCRAFT CABIN BLOWER SYSTEM HAVING A TRANSMISSION RECEIVING MECHANICAL POWER FROM A FIRST AND SECCOND INPUT WHEREIN THE FIRST INPUT IS CONFIGURED TO RECEIVE MECHANICAL POWER FROM A TURBINE ENGINE AND A FIRST ELECTRICAL MACHINE TO CONFIGURED TO RECEIVE MECHANICAL POWER FROM THE TURBINE ENGINE INDEPENDENT OF THE TRANSMISSION

(71) Applicant: ROLLS-ROYCE plc, London (GB)

(72) Inventors: Glenn A Knight, Belper (GB); Richard Sharpe, Leek (GB)

(73) Assignee: ROLLS-ROYCE plc, London (GB)

(*) Notice: Subject to any disclaimer, the term of this patent is extended or adjusted under 35 U.S.C. 154(b) by 132 days.

(21) Appl. No.: 16/239,338

(22) Filed: Jan. 3, 2019

(65) Prior Publication Data
US 2019/0233125 A1 Aug. 1, 2019

(30) Foreign Application Priority Data
Jan. 26, 2018 (GB) .................... 1801298

(51) Int. Cl.
B64D 13/02 (2006.01)
F01D 15/10 (2006.01)
(Continued)

(52) U.S. Cl.
CPC ............ B64D 13/04 (2013.01); B64D 13/02 (2013.01); F01D 15/10 (2013.01); F02C 7/26 (2013.01);
(Continued)

(58) Field of Classification Search
CPC ......... B64D 13/02; B64D 13/04; F01D 15/10; F02C 7/26; F02C 7/32; F04D 25/06;
(Continued)

(56) References Cited

U.S. PATENT DOCUMENTS 3,965,673 A * 6/1976 Friedrich ............... B64D 13/06
60/788
4,487,034 A * 12/1984 Cronin ...................... F25B 5/02
62/402

(Continued)

FOREIGN PATENT DOCUMENTS

EP 1477705 A1 11/2004
EP 2 584 172 A2 4/2013
(Continued)

OTHER PUBLICATIONS

Jul. 19, 2018 Search Report issued in British Patent Application No. 1801300.3.
(Continued)

Primary Examiner — Patrick Hamo
Assistant Examiner — Benjamin Doyle
(74) Attorney, Agent, or Firm — Oliff PLC

(57) ABSTRACT

An aircraft cabin blower system includes a transmission configured to receive mechanical power from a gas turbine engine in the form of a first transmission input; and an electrical circuit including a first electrical machine, a second electrical machine, and power management system, wherein, when operating in a blower mode, the first electrical receives mechanical power from the gas turbine engine and act as a generator to provide electrical power to the power management system, and the second electrical machine acts as a motor providing mechanical power to the transmission in the form of a second transmission input, the second electrical machine being driven by electrical power
(Continued)

from the power management system. The transmission's output drives a cabin blower compressor when operating in the blower mode, a speed of the output of the transmission being determined by a function of a speed of the first and second transmission inputs.

22 Claims, 6 Drawing Sheets

(51) Int. Cl.
*F02C 7/26* (2006.01)
*F02C 7/32* (2006.01)
*F04D 25/06* (2006.01)
*F16H 1/28* (2006.01)
*B64D 13/04* (2006.01)
*F16H 3/08* (2006.01)

(52) U.S. Cl.
CPC ............... *F02C 7/32* (2013.01); *F04D 25/06* (2013.01); *F16H 1/28* (2013.01); *F16H 3/08* (2013.01); *F05D 2220/323* (2013.01); *F05D 2220/76* (2013.01); *F05D 2260/40311* (2013.01)

(58) Field of Classification Search
CPC .......... F05D 2220/323; F05D 2220/76; F05D 2260/40311; F16H 1/28; F16H 3/08; Y02T 50/40
USPC .......................................................... 417/374
See application file for complete search history.

(56) References Cited

U.S. PATENT DOCUMENTS

| | | | | |
|---|---|---|---|---|
| 4,514,991 | A * | 5/1985 | Zinsmeyer | F16H 3/72 475/2 |
| 4,900,231 | A * | 2/1990 | Kennedy | B64D 41/00 417/16 |
| 5,125,806 | A * | 6/1992 | Quick | F04D 25/04 417/212 |
| 7,179,186 | B2 * | 2/2007 | Bucknor | B60K 6/365 475/5 |
| 9,114,804 | B1 * | 8/2015 | Shukla | B60K 6/26 |
| 9,729,096 | B2 * | 8/2017 | Edwards | F02C 9/28 |
| 10,053,030 | B2 * | 8/2018 | Vyas | B60R 16/03 |
| 10,208,675 | B2 | 2/2019 | Mackin | |
| 2004/0161340 | A1 | 8/2004 | Rimkus et al. | |
| 2006/0034693 | A1 | 2/2006 | Lardellier | |
| 2007/0151258 | A1 * | 7/2007 | Gaines | F02K 3/06 60/792 |
| 2012/0153076 | A1 * | 6/2012 | Burns | B64D 41/00 244/58 |
| 2014/0123963 | A1 | 5/2014 | Glugla et al. | |
| 2014/0260306 | A1 * | 9/2014 | Dooley | F02C 7/26 60/778 |
| 2014/0297080 | A1 | 10/2014 | Okamoto | |
| 2015/0275769 | A1 * | 10/2015 | Foutch | F02C 7/27 60/776 |
| 2016/0032841 | A1 | 2/2016 | Ronan | |
| 2016/0061293 | A1 * | 3/2016 | Hwang | F16H 3/724 477/36 |
| 2016/0167789 | A1 * | 6/2016 | Knight | B64D 13/02 454/71 |
| 2016/0167790 | A1 | 6/2016 | Hipsky et al. | |
| 2016/0355270 | A1 | 12/2016 | Bruno et al. | |
| 2017/0113808 | A1 | 4/2017 | Bond | |
| 2017/0284408 | A1 | 10/2017 | Ricordeau et al. | |
| 2017/0320585 | A1 * | 11/2017 | Armstrong | B64D 27/24 |
| 2017/0370242 | A1 * | 12/2017 | Bacic | B64D 27/10 |
| 2018/0009536 | A1 | 1/2018 | Christopherson et al. | |
| 2018/0266329 | A1 * | 9/2018 | Mackin | H02K 7/116 |
| 2018/0283274 | A1 * | 10/2018 | Jackowski | F02C 6/14 |
| 2019/0071190 | A1 * | 3/2019 | Nestel | F04B 35/04 |
| 2019/0077514 | A1 | 3/2019 | Silet et al. | |
| 2019/0233124 | A1 * | 8/2019 | Sharpe | B64D 13/02 |
| 2019/0383220 | A1 * | 12/2019 | Mackin | F02C 7/277 |
| 2020/0153252 | A1 * | 5/2020 | Long | H02J 4/00 |
| 2020/0180772 | A1 * | 6/2020 | Richardson | B64D 13/06 |
| 2020/0240331 | A1 * | 7/2020 | Kupratis | F01D 25/36 |

FOREIGN PATENT DOCUMENTS

| | | |
|---|---|---|
| EP | 3 023 625 A1 | 5/2016 |
| EP | 3 034 405 A1 | 6/2016 |
| GB | 621123 A | 4/1949 |
| GB | 686547 A | 1/1953 |
| GB | 2549597 A | 10/2017 |
| WO | 2017/168074 A1 | 10/2017 |

OTHER PUBLICATIONS

Jul. 20, 2018 Search Report issued in British Patent Application No. 1801298.9.
Jul. 20, 2018 Search Report issued in British Patent Application No. 1801301.1.
U.S. Appl. No. 16/238,841, filed Jan. 3, 2019 in the name of Sharpe et al.
U.S. Appl. No. 16/238,700, filed Jan. 3, 2019 in the name of Sharpe et al.
Apr. 25, 2019 Search Report issued in European Patent Application No. 18214432.
May 17, 2019 Extended Search Report issued in European Patent Application No. 18214429.5.
May 24, 2019 Extended Search Report issued in European Patent Application No. 18214437.8.
Jul. 10, 2020 Office Action Issued in U.S. Appl. No. 16/238,700.
Feb. 3, 2021 Office Action issued in U.S. Appl. No. 16/238,700.

* cited by examiner

AIRCRAFT CABIN BLOWER SYSTEM HAVING A TRANSMISSION RECEIVING MECHANICAL POWER FROM A FIRST AND SECCOND INPUT WHEREIN THE FIRST INPUT IS CONFIGURED TO RECEIVE MECHANICAL POWER FROM A TURBINE ENGINE AND A FIRST ELECTRICAL MACHINE TO CONFIGURED TO RECEIVE MECHANICAL POWER FROM THE TURBINE ENGINE INDEPENDENT OF THE TRANSMISSION

The present disclosure concerns cabin blower systems for aircraft. The disclosure also concerns aircraft having cabin blower systems and methods of operating cabin blower systems.

Cabin blower systems are used to pressurise the cabins of aircraft and to provide wing anti- or de-icing. Cabin blowers are typically driven by one or more associated gas turbine engines of the aircraft. The gas turbine engine may be used to drive a cabin blower compressor in a number of ways (e.g. using electrical power generated by the engine or mechanically). Where mechanical driving of the compressor is employed, drive is typically taken from a shaft of the gas turbine engine via an accessory gearbox. A means of varying the speed of the drive delivered to the compressor is also required; it is not desirable for the cabin air flow and pressure to be determined by the particular operating point of the gas turbine at any particular moment. Therefore a gearing mechanism such as a continuously variable transmission is also provided in the drive path between the accessory gearbox and compressor. This system ensures that regardless of engine operating point and ambient air pressure the cabin flow and pressure can be maintained within acceptable limits.

Mechanical driving of the compressor may, in some circumstances, be undesirable because it may introduce particular architectural constraints. In particular, the locations at which drive can be taken from the engine may be limited. Both mechanical and hydraulic systems may be limited by the size and weight of the system, and therefore an alternative solution is sought.

According to a first aspect, there is provided an aircraft cabin blower system comprising: a transmission configured to receive mechanical power from a gas turbine engine in the form of a first transmission input; and an electrical circuit comprising a first electrical machine, a second electrical machine, and a power management system, wherein, when operating in a blower mode, the first electrical machine is configured to receive mechanical power from the gas turbine engine and act as a generator to provide electrical power to the power management system, and the second electrical machine is configured to act as a motor providing mechanical power to the transmission in the form of a second transmission input, the second electrical machine being driven by electrical power from the power management system; wherein an output of the transmission is configured to drive a cabin blower compressor when operating in the blower mode, a speed of the output of the transmission being determined by a function of a speed of the first and second transmission inputs.

The speed of the output of the transmission, and thus that which is driving the cabin blower compressor can be tailored by adjustment of the second transmission input in order to provide a speed that is different from that of the first transmission input. Due to the transmission, the output speed can be above or below that of the first transmission input, with the same speed being provided when the second transmission input is zero. The function could be an addition of the speeds of the first transmission input and second transmission input, or could be any other function resulting in a ratio or relationship between the first transmission input and second transmission input.

The aircraft cabin blower system may be further configured to operate in a starter mode, wherein, when operating in the starter mode, the first electrical machine is configured to act as a motor to provide mechanical power to the gas turbine engine to facilitate starting of the gas turbine engine, the first electrical machine being driven by electrical power from the power management system.

When operating in the starter mode, the second electrical machine may be configured to receive mechanical power from the transmission and act as a generator to provide electrical power to the power management system.

The transmission may be configured to receive mechanical power from the cabin blower compressor acting as an expander, at least part of this mechanical power being provided to the second electrical machine. In this way, starting of the gas turbine engine can be facilitated by mechanical drive from the compressor and electrical drive from the first electrical machine.

Alternatively, when operating in the starter mode, the second electrical machine may be configured to act as a motor to provide mechanical power to the gas turbine engine, the second electrical machine being driven by electrical power from the power management system. In this way, electrical starting of the gas turbine engine can be facilitated, this starting being accomplished through joint use of both of the first and second electrical machines.

In the starter mode, a gearbox-mounted electric generator of the gas turbine engine may be configured to act as a motor to provide additional mechanical power to the gas turbine engine to facilitate engine start.

The gearbox-mounted electric generator may be configured to receive electrical power from the power management system.

The power management system may include a storage device such as a battery or a capacitor configured to store electrical power.

The power management system may be configured to provide input power to one of the first electrical machine and the second electrical machine, the input power being provided at a different rate from an output power received by the power management system from the other of the first electrical machine and the second electrical machine.

The ratio of the input power to the output power may be variable. 11. The ratio of the input power to the output power may be continuously variable. The ratio may be variable by a power management circuit.

The power management system may be configured to receive power from an external power source such as a ground cart, an aircraft auxiliary power unit, or another power source. Power may be obtained, for example, from a gas turbine engine on the same aircraft, which is already running.

The transmission may comprise an epicyclic gearbox.

The aircraft cabin blower system may further comprise a second transmission which may be configured to provide any one of a plurality of discrete gear ratios of the second transmission, the second transmission being arranged to transmit mechanical power from the gas turbine engine to the first transmission input and to the first electrical machine in a blower mode of the system. The second transmission may also be arranged to transmit mechanical power from the first transmission input and the first electrical machine to the gas turbine engine in a starter mode of the system.

Mechanical power from the gas turbine engine may be transmitted to the first transmission input and to the first electrical machine, or as the case may be to the second transmission, via either an accessory gearbox or a dedicated radial drive in a blower mode of the system. Similarly, in a starter mode of the system, mechanical power may be transmitted from the first transmission input and the first electrical machine, or as the case may be from the second transmission, to the gas turbine engine via either the accessory gearbox or the dedicated radial drive.

According to a second aspect of the disclosure, there is provided an aircraft comprising an aircraft cabin blower system according to the first aspect.

According to a third aspect, there is provided a method of operating an aircraft cabin blower system comprising a transmission configured to receive mechanical power from a gas turbine engine in the form of a first transmission input, and an electrical circuit comprising a first electrical machine, a second electrical machine, and a power management system, the method comprising the steps of: when operating in a blower mode, providing mechanical power from the gas turbine engine to the first electrical machine such that the first electrical machine operates as a generator, the first electrical machine providing electrical power to the power management system; providing electrical power from the power management system to the second electrical machine such that the second electrical machine operates as a motor, the second electrical machine providing mechanical power to the transmission in the form of a second transmission input; a speed of the output of the transmission being determined by a function of the speeds of the first and second transmission inputs.

The method may further comprise the steps of, when operating in a starter mode, providing electrical power from the power management system to the first electrical machine such that the first electrical machine operates as a motor, the first electrical machine providing mechanical power to the gas turbine engine in order to facilitate starting of the gas turbine engine.

The method may further comprise the steps of, when operating in the starter mode, providing mechanical power from the transmission to the second electrical machine such that the second electrical machine operates as a generator, the second electrical machine providing electrical power to the power management system.

Alternatively, the method may further comprise the steps of, when operating in the starter mode, providing electrical power from the power management system to the second electrical machine such that the second electrical machine operates as a motor, the second electrical machine providing mechanical power to the gas turbine engine to facilitate starting of the gas turbine engine.

When operating in a blower mode, mechanical power from the gas turbine engine may be transmitted to the first transmission input and the first electrical machine via a second transmission which may be configured to provide any one of a plurality of discrete gear ratios of the second transmission. In a starter mode, mechanical power may be transmitted to the gas turbine engine from the first transmission input and the first electrical machine via the second transmission.

Mechanical power may be transmitted from the gas turbine engine to the first transmission input and the first electrical machine, or as the case may be to the second transmission, via an accessory gearbox in a blower mode, and from the first transmission input and the first electrical machine, or as the case may be from the second transmission, to the gas turbine engine via the accessory gearbox in a starter mode.

Mechanical power may be transmitted from the gas turbine engine to the first transmission input and the first electrical machine, or as the case may be to the second transmission, via a dedicated radial drive in a blower mode, and from the first transmission input and the first electrical machine, or as the case may be from the second transmission, to the gas turbine engine via the dedicated radial drive in a starter mode.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
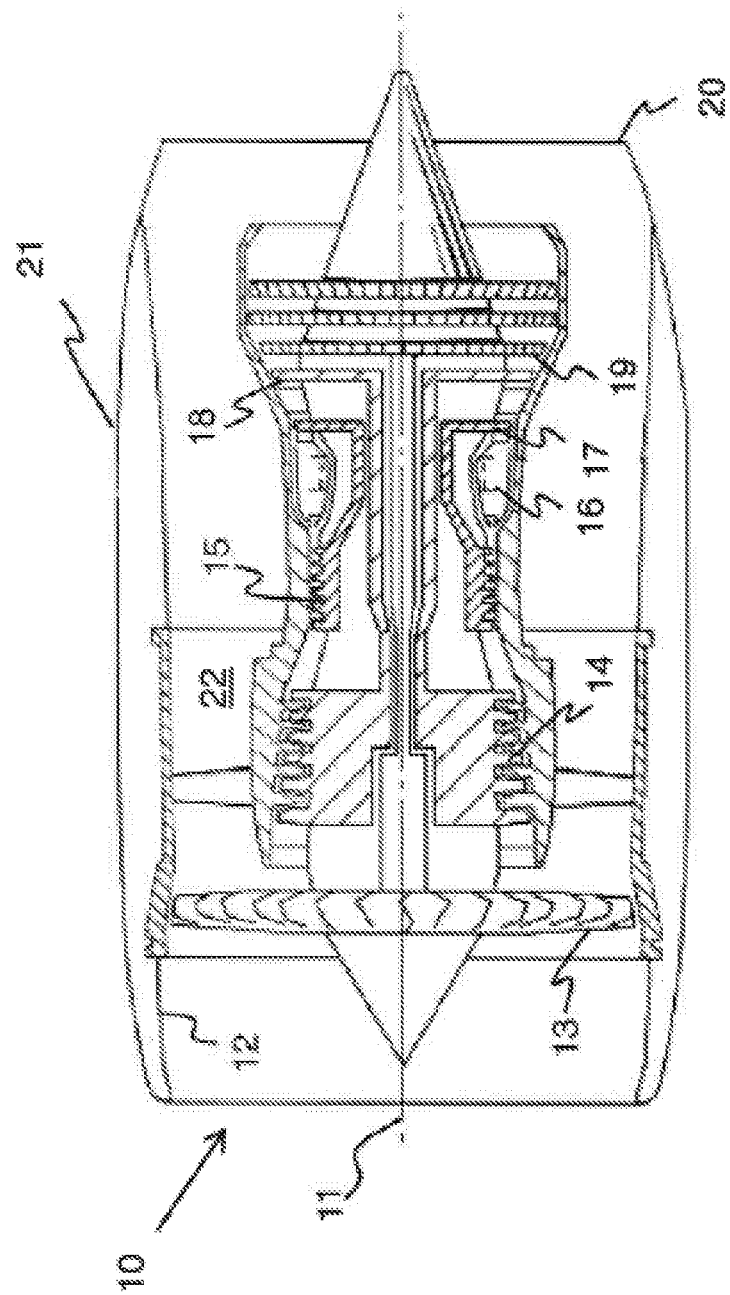
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate-pressure compressor 14, a high-pressure compressor 15, combustion equipment 16, a high-pressure turbine 17, an intermediate-pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate-pressure compressor 14 and a second air flow which passes through a bypass duct 22 to provide propulsive thrust. The intermediate-pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high-, intermediate- and low-pressure turbines 17, 18, 19 before being exhausted through the nozzle 20 to provide additional propulsive thrust. The high—17, intermediate—18 and low—19 pressure turbines drive respectively the high-pressure compressor 15, intermediate-pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
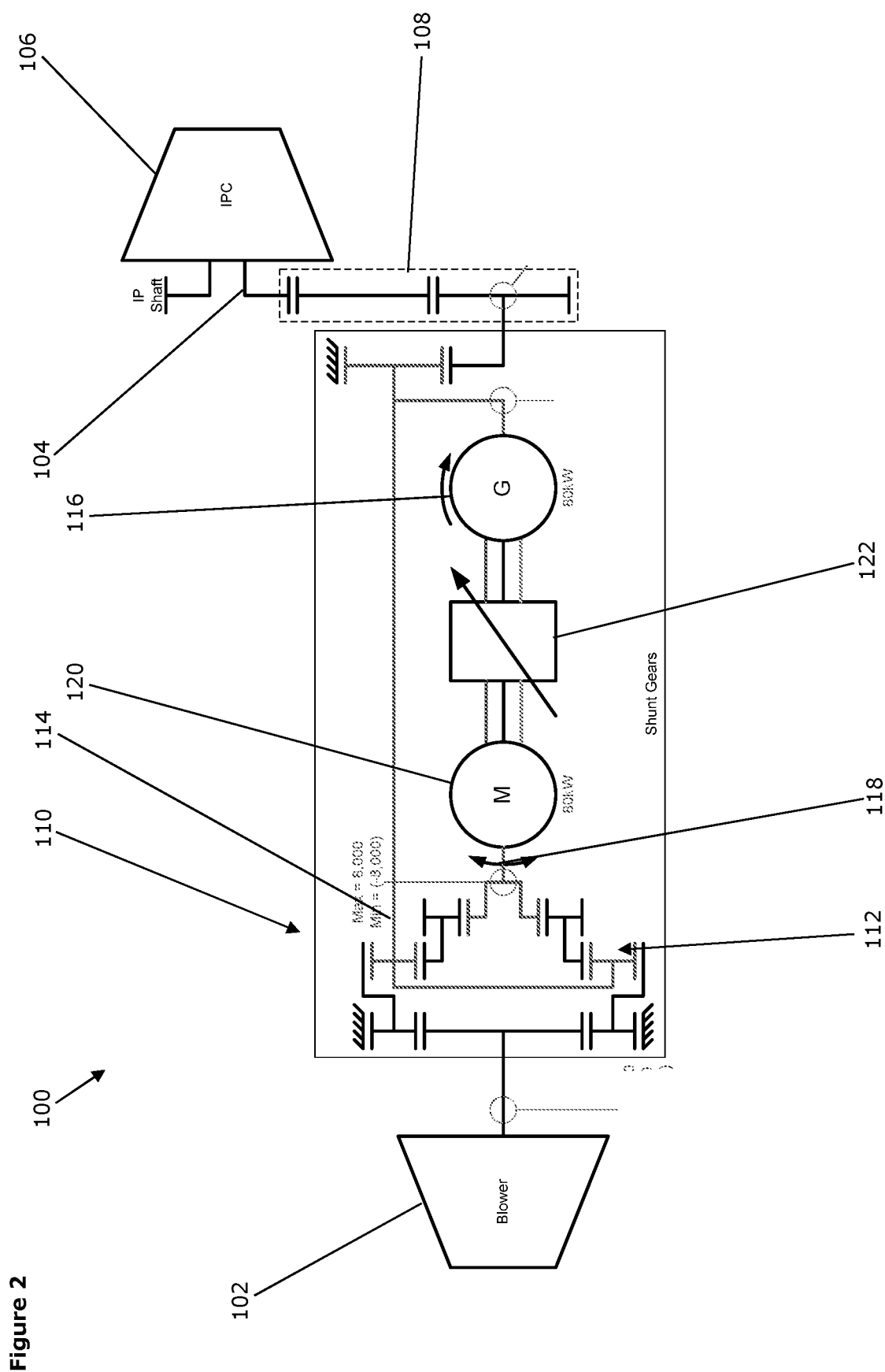
FIG. 2 is a schematic depiction of an embodiment of an aircraft cabin blower system.

Referring now to FIG. 2, a first embodiment of an aircraft cabin blower system 100 is depicted in schematic form. The cabin blower system 100 includes a cabin blower compressor 102 and a power source in the form of an intermediate-pressure shaft 104 of an intermediate-pressure compressor 106 of a gas turbine engine. The intermediate-pressure compressor 106 powers an accessory gearbox 108 of the gas turbine engine, which, in turn, provides power to a transmission 110 of the cabin blower system 100. The accessory gearbox 108 may be powered by the low-pressure shaft, intermediate-pressure shaft, or the high-pressure shaft of any gas turbine engine.

The transmission 110 comprises a summing epicyclic gearbox 112 with two inputs. A first transmission input 114 of the epicyclic gearbox 112 is provided mechanically from the accessory gearbox 108 to a part of the epicyclic gearbox 112. The accessory gearbox 108 also provides mechanical power to a first electrical machine 116 which, in a blower mode of the cabin blower system 100, operates as a generator to convert the mechanical power received from the accessory gearbox 108 to electrical power. A second transmission input 118 of the epicyclic gearbox 112 is provided from a second electrical machine 120 which, in the blower mode of the cabin blower system 100, operates as a motor to convert electrical power to mechanical power, which is provided to the epicyclic gearbox 112.

A power management system 122 interconnects the first electrical machine 116 and second electrical machine 120. In the blower mode being described here, the power management system 122 receives electrical power from the first electrical machine 116 and sends said power to the second electrical machine 120. Thus, despite in this embodiment both the first electrical machine 116 and the second electrical machine 120 being 80 kW motor-generators, the second electrical machine 120 can be driven as a motor at a different speed from the speed of the first electrical machine 116 acting as a generator at that time. Moreover, the power management system 122 can provide a continuously-variable difference between the power received from the first electrical machine 116 and the power output to the second electrical machine 120.

The power management system can include electrical storage, in the form for example of one or more batteries, capacitors or similar, that enables the power management system to output more power than is being received by the power management system at any moment.

The epicyclic gearbox 112, as previously mentioned, is a summing epicyclic gearbox configured to have an output that is a function of the speeds of the first input 114 and the second input 118. In the present embodiment, the first input 114 is always positive, resulting in operation of the compressor 102. The second input 118, which can be rotated either positively or negatively by the second electrical machine 120, acts to provide either a positive or negative input to the epicyclic gearbox 112. Thus, the output of the epicyclic gearbox 112 that feeds to the compressor 102 can be adjusted continuously by the operation of the second electrical machine 120 such that the output is greater or less than that which would be provided were the only input to the epicyclic gearbox 112 to be the first input 114. The function of the epicyclic gearbox 112 may result in the output being the sum of the first and second inputs 114, 118 or may otherwise be related to the difference by way of a ratio provided by the epicyclic gearbox 112, for example.

The operation of a summing epicyclic gearbox 112 will be known to the person skilled in the art and therefore alternative implementations will be apparent. Moreover, other forms of summing gearbox may also be used, in addition to or as a replacement for the epicyclic gearbox 112 depicted.

As the speed of the accessory gearbox 108 may vary with operation of the gas turbine engine, the present embodiment can be operated to enable the output of the cabin blower compressor 102 to be at a speed required by an aircraft, to create the desired temperature, pressure, or air flow-rate. This can be managed without any power loss associated with bleed valves or other such features, although these could also be included for emergency operation, if required.

In addition to operation in the blower mode, the cabin blower system 100 can also be operated in a starter mode in order to provide mechanical input to the gas turbine engine to facilitate a start operation of the gas turbine engine. The cabin blower compressor 102 can operate in reverse as an expander to provide drive to the epicyclic gearbox 112 from a supply of compressed air.

The second electrical machine 120 can then be held still such that the transmission 110 transmits the mechanical power from the compressor 102 to the accessory gearbox 108. The accessory gearbox 108 will in turn cause the intermediate-pressure compressor 106 to rotate, which facilitates starting of the gas turbine engine. The remaining steps required for the successful ignition of a gas turbine engine will be known to the person skilled in the art and are therefore not discussed in the present disclosure.

In addition to the input from the compressor 102, the first electrical machine 116, which operated in the blower mode as a generator, can be powered by the power management system 122 such that the first electrical machine 116 acts as a motor, in the starter mode. The mechanical power generated by the first electrical machine 116 can therefore be added to that provided by the compressor 102, both the compressor 102 and the first electrical machine 116 causing rotation of the accessory gearbox 108 and thus intermediate-pressure compressor 106. As such, the present embodiment both provides a variable speed compressor 102 and an electrically-assisted starting operation for a gas turbine engine.

Figure 3:
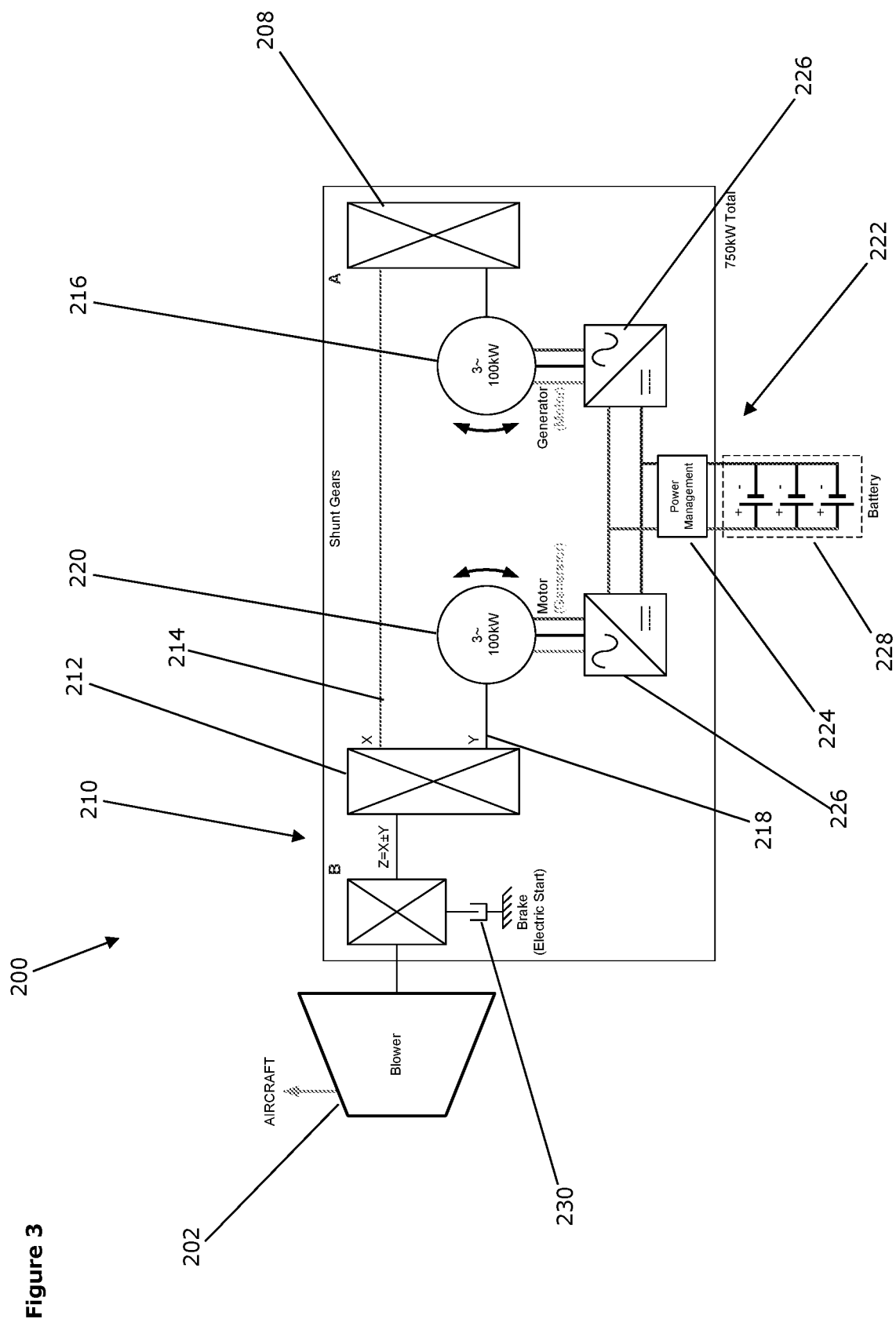
FIG. 3 is a schematic depiction of another embodiment of an aircraft cabin blower system.

A second embodiment is depicted in simplified schematic form in FIG. 3. The second embodiment operates in much the same way as the first embodiment, differing in only some features. Therefore, for brevity, only the differences between the second embodiment and the first embodiment will be discussed in detail. Similar reference numerals are used for similar features, with the first digit of the reference indicating the embodiment to which it refers.

A power management system 222 of the second embodiment of a cabin blower system 200 includes a power management circuit 224 that coordinates power receipt and transmission from an AC/DC converter 226 associated with each of a first electrical machine 116 and a second electrical machine 120. A battery 228 is also provided that enables power to be stored. This power can therefore be used during blower mode operation to allow the second electrical machine 220 to work as a motor with a greater power output than that being generated by the first electrical machine 216 at that moment. Additionally, the power management system 222 of the second embodiment allows starter mode operation using electrical power alone.

A brake 230 is provided that acts on a part of a transmission 210 between an epicyclic gearbox 212 and a compressor 202. With the brake 230 actuated, the shaft of the epicyclic gearbox 212 that powers the compressor 202 is prevented from moving. The power management system 222 can therefore power both the first electrical machine 216 and the second electrical machine 220 from the battery 228 such that they both act as motors. As in the first embodiment, the first electrical machine 216 feeds directly to an accessory gearbox 208, and the second electrical machine 220 feeds to the epicyclic gearbox 212. However, as the compressor shaft is braked, mechanical power from the second electrical machine 220 is transmitted through the epicyclic gearbox 212 and to the accessory gearbox 208. Thus, a solely-electric starter mode can be implemented by the second embodiment. Epicyclic gearbox 212 has first and second transmission inputs 214, 218.

Although the solely-electric starter mode is enabled, air-starting by passing compressed air in reverse through the compressor 202 can be implemented in the same manner as in the first embodiment.

A further benefit of the inclusion of energy storage, in the second embodiment provided through use of the battery 228, is that the energy can be used after shutdown of the engine to maintain rotation of the engine. Relatively slow rotation of the engine, compared to normal operating speeds, acts to even out any thermal gradients that may otherwise be formed or remain in the engine once shut down by allowing heat to dissipate evenly through the rotating shaft. Without cooling, such thermal gradients can cause distortion of casing and shafts leading to vibration and rubbing of some components, such as compressor linings. The stored energy could additionally or alternatively be used to power aircraft function during unpowered descents, such as maintaining electrical power and powering aircraft control surfaces.

Energy storage could also be provided by way of ground power, auxiliary power unit (APU) or Seebeck effect devices on the aircraft.

Figure 4:
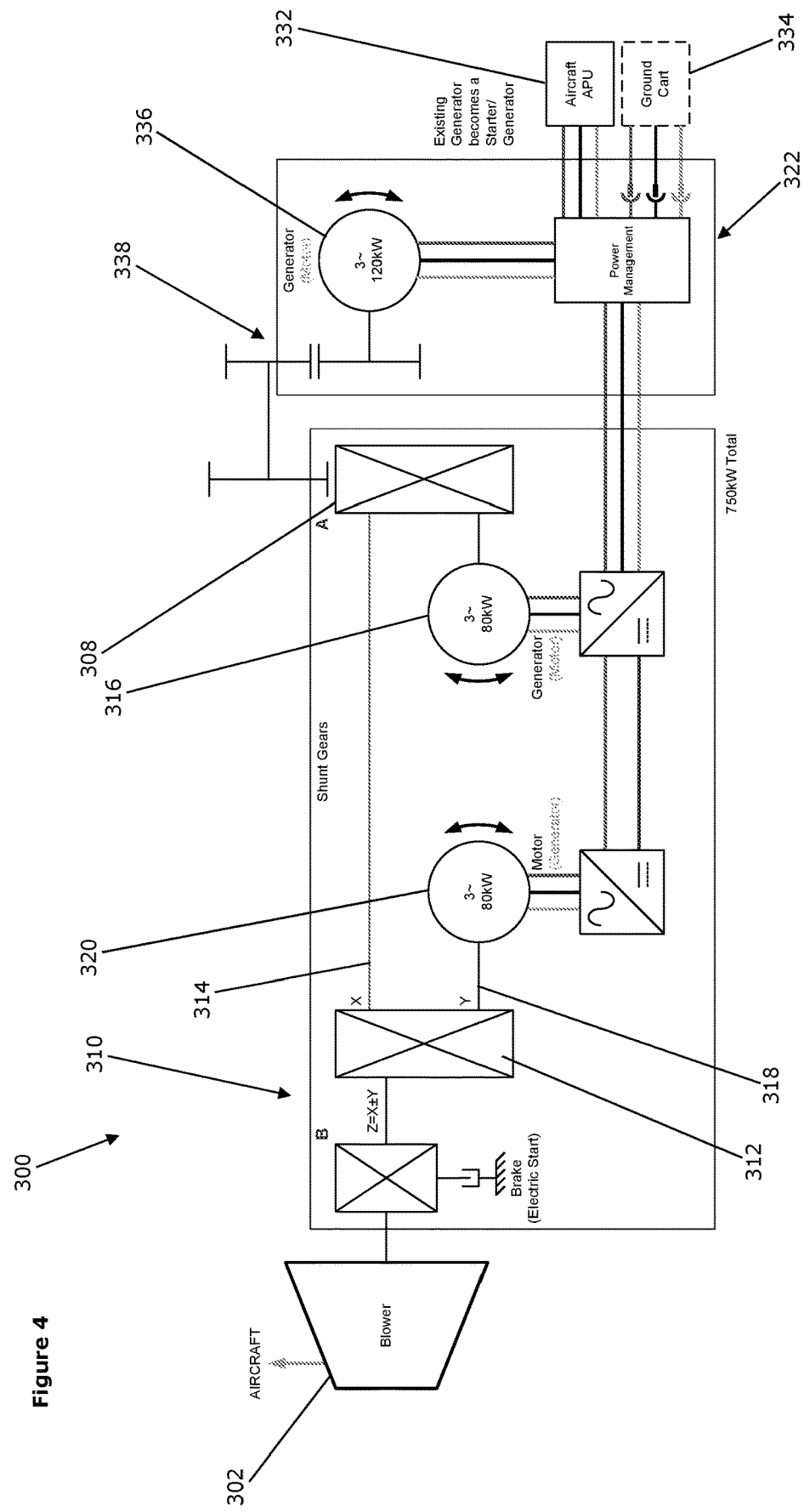
FIG. 4 is a schematic depiction of another embodiment of an aircraft cabin blower system.

In a third embodiment of a cabin blower system 300, shown in FIG. 4, a power management system 322 includes an input configured to receive power from an aircraft auxiliary power unit 332 and an input configured for the connection of a ground cart 334, for receiving power when grounded. The cabin blower system 300 can therefore allow a cabin blower compressor 302 to be powered by the auxiliary power unit 332 when on the ground and therefore the provision of a separate cabin blower that is driven solely by the auxiliary power unit 332 is unnecessary, such a separate cabin blower being commonly provided on some aircraft. A pipe connecting such a separate cabin blower to the aircraft's pneumatic system would also be surplus to requirements. Epicyclic gearbox 312 has first and second transmission inputs 314, 318.

A gearbox-mounted electric generator 336, commonly found on gas turbine engines, can be integrated into the cabin blower system 300. Whilst the gearbox-mounted electric generator 336 is usually too small in itself to allow engine starting to be facilitated, its combination with the cabin blower system 300 could provide enough power. Thus, where the cabin blower system 300 operating in starter mode would not be large enough to start the gas turbine engine by itself—for example, where optimisation for engine starting would lead to a reduction in power capacity—integration of the gearbox-mounted electric generator 336 with the cabin blower system 300 might provide sufficient power for engine starting.

The gearbox-mounted electric generator 336 is therefore shown with a further mechanical transmission 338 to an aircraft accessory gearbox 308 and controlled by a power management system 322. Thus, the gearbox-mounted electric generator 336, in operation as a motor, along with first and second electrical machines 316, 320 as described in the previous embodiments, could provide further enhanced operation.

A two-phase electric start of the gas turbine engine can also be implemented with this arrangement. A transmission 310 of the cabin blower system 300 could be used for a high-torque initial start of the starter mode, whilst the gearbox-mounted electric generator 336 could then take over this function once a maximum speed of the transmission 310 is reached. Thus, for example, a high breakaway-torque can be applied to engine shafts on very cold days and a decreased engine start time may be enabled. The transmission 310 and the gearbox-mounted electric generator 336 could be connected to different shafts, i.e. one on the high-pressure shaft and one on the low-pressure shaft, or one on the high-pressure shaft and one on the intermediate-pressure shaft, or one on the intermediate-pressure shaft and one on the low-pressure shaft, as necessary. By doing so, load of the cabin blower can be distributed across different shafts to enhance engine operability and starting. Additionally, where the low-pressure shaft is connected to the system, in emergency situations or when windmilling, the low-pressure shaft can supply electrical power to the aircraft or rotate the blower for environmental control system function.

In such a system, a low-pressure shaft-mounted generator can then allow a high-pressure shaft-mounted motor to rotate the high-pressure shaft, enhancing the windmill relight envelope of the engine. A windmilling low-pressure shaft would also then be able to replace a ram air turbine function of the aircraft, saving weight and/or space.

Figure 5:
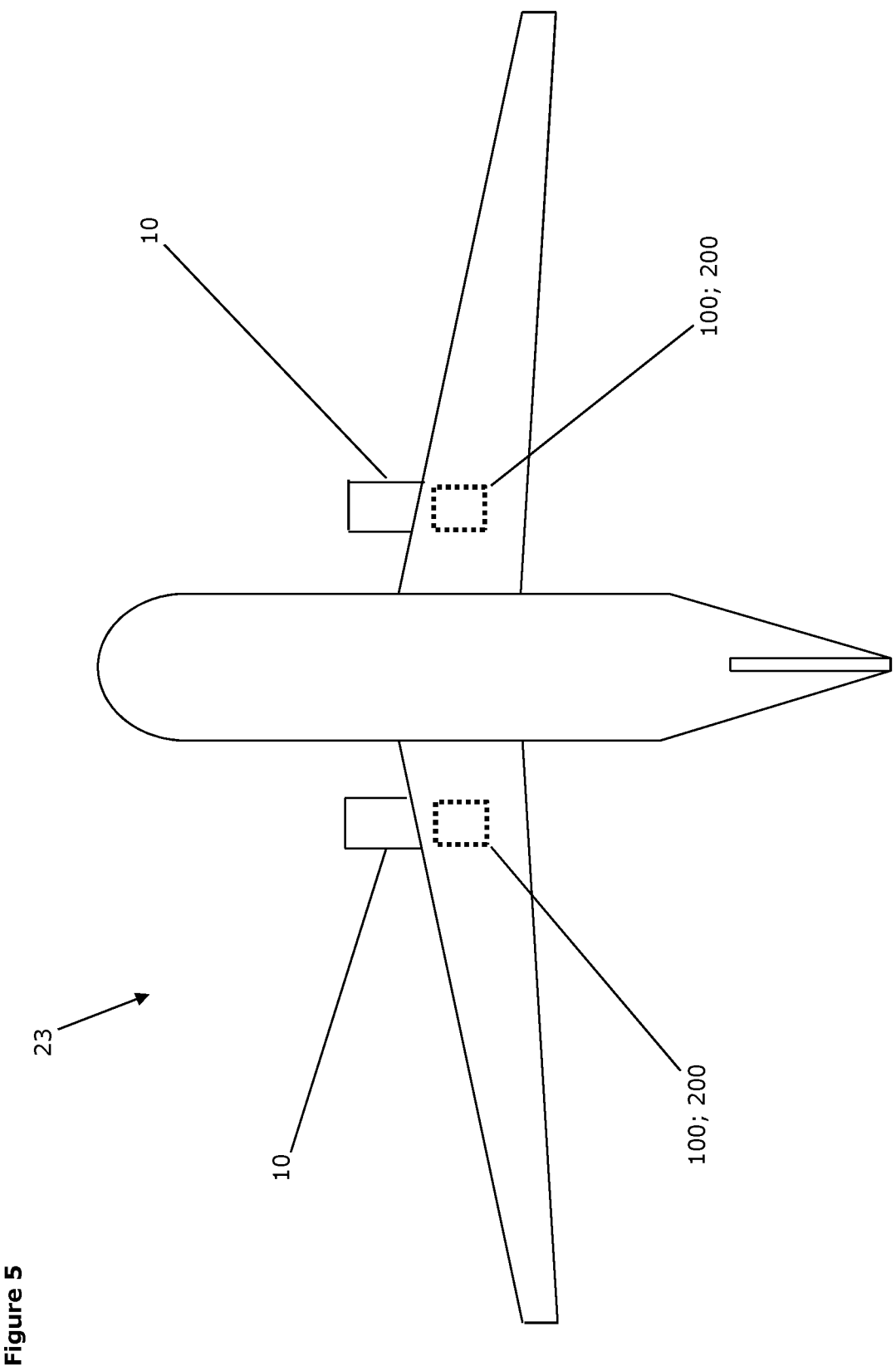
FIG. 5 is a plan view of an aircraft including two engines and a cabin blower system.

Depicted in FIG. 5 is an aircraft 23 including two gas turbine engines 10 and two associated cabin blower systems 100, 200.

Figure 6:
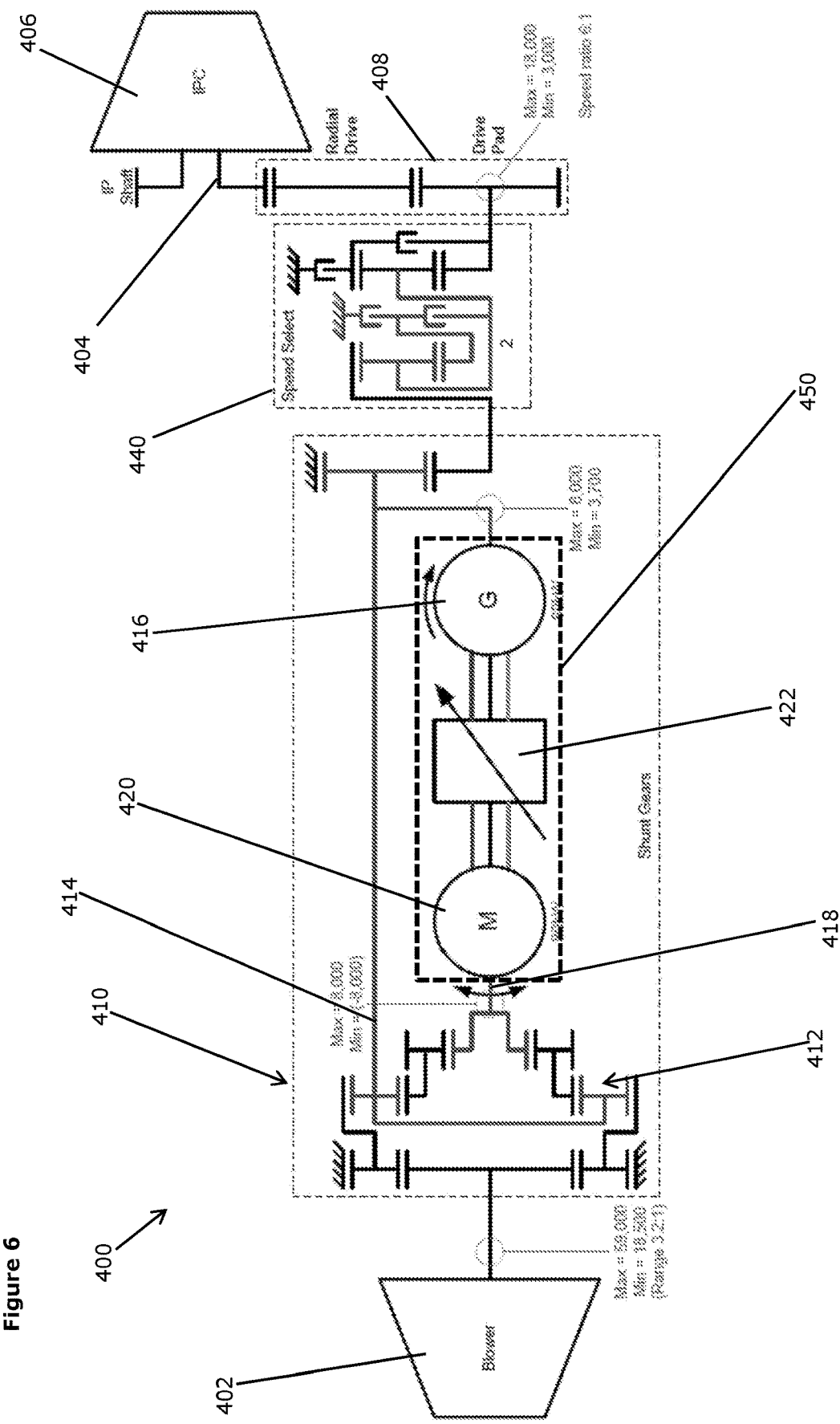
FIG. 6 is a schematic depiction of another embodiment of an aircraft cabin blower system.

FIG. 6 schematically depicts a fourth example aircraft cabin blower system generally indicated by 400. The system 400 is similar to the system 100 of FIG. 2; parts of the system 400 of FIG. 6 are labelled with reference signs differing by 300 from those labelling corresponding parts of the system 100 of FIG. 2. The system 400 comprises a second transmission 440 arranged to transmit mechanical power from an accessory gearbox 408 to a first transmission 410 in a blower mode of the system 400. The second transmission 440 comprises a plurality of gears configured to be selectively engagable to provide any one of a plurality of fixed (discrete) gear ratios. The first transmission 410 comprises first and second electrical machines 416, 420 and a power management system 422, which collectively constitute a variator 450, and an epicyclic gearbox 412 having first and second transmission inputs 414, 418.

In the blower mode of the system 100 of FIG. 2, the change in speed between the accessory gearbox 108 and the compressor 102 may be varied by means of the first transmission 110 in which the first and second electrical machines 116, 120 and the power management system 122 constitute a variator. The output speed of the variator is either added to or subtracted from the output speed of the accessory gearbox 108 at the epicyclic gearbox 112 to determine the output speed of the first transmission 110 and hence the speed of the compressor 102. Variation of the speed of the compressor 102, about that determined by the epicyclic gearbox 112 and the first transmission input 114, is achieved entirely by the variator, which may therefore be required to generate a large range of possible speeds using input from the accessory gearbox 108.

In a blower mode of the system 400 of FIG. 6, the input speed to the first transmission 410 may be varied in discrete steps by means of the second transmission 440. The first transmission 410 operates to trim or adjust the output speed of the second transmission 440 so that the output speed of the first transmission 410, and hence that of the compressor 402, has a desired value.

When the overall change in speed between the output of the accessory gearbox 408 and the compressor 402 is required to be changed, most of the change is achieved by means of the second transmission 440 with only a small proportion of the speed change being provided by the first transmission 410.

By employing the second transmission 440 together with the first transmission 410, the size and weight of the variator 450 of the first transmission 410 may be reduced compared to the variator of the first transmission 110 in the system 100 of FIG. 2 because the maximum speed variation required of the first transmission 440 is less than that of the first transmission 110.

The overall mechanical power transmission efficiency between the accessory gearbox 408 and the epicyclic gearbox 412 is increased compared to the mechanical power transmission efficiency between the accessory gearbox 108 and epicyclic gearbox 112 in the system 100 of FIG. 2. The transmission efficiency of the second transmission 440 is close to 100%. The transmission efficiency between the output of the second transmission 440 and the first transmission input 414 is also close to 100%. The transmission efficiency between the output of the second transmission 440 and the second transmission input 418 via the variator 450 is approximately 90%. The variator 450 carries a proportion of the power transmitted from the output of the second transmission 440 to the epicyclic gearbox 412 which is smaller than the proportion of the power output from the accessory gearbox 108 and transmitted to the epicyclic gearbox 112 via the variator of the system 100 of FIG. 2. The overall transmission efficiency of the two transmissions 410, 440 of the system 400 is therefore greater than the overall transmission efficiency of the transmission 110 of the system 100 of FIG. 2.

If the variator 450 transmits 50% of the power output from the second transmission 440 to the epicyclic gearbox 412, with the remaining 50% being transmitted directly to the first transmission input 414, then the overall transmission efficiency between the output of the second transmission 440 and the epicyclic gearbox 412 is (0.5×100%)+(0.5×90%)=95%. If the variator 450 transmits 20% of the power output from the second transmission 440 to the epicyclic gearbox 412 and the remaining 20% is transmitted directly to the first transmission input 414, then the overall efficiency is (0.8×100%)+(0.2×90%)=98%. If the variator 450 transmits 10% of the power output from the second transmission 440 to the second transmission input 418 and the remaining 90% is transmitted directly to the first transmission input 414, then the overall efficiency is (0.9×100%)+(0.1×90%)=99%. The overall efficiency therefore increases as the proportion of power carried by the variator 450 decreases. By increasing the number of fixed (discrete) selectable gear ratios in the second transmission 440, the size and weight of the variator 450 may be further reduced and the overall efficiency of power transmission from the accessory gearbox 408 to the compressor 402 may be further increased, for a given maximum speed variation between these elements.

A transmission having a number of selectable, fixed (discrete) gear ratios may also be employed to similar effect in either of the systems 200, 300 of FIGS. 3 and 4 respectively.

In variants of the systems 100, 200, 300, 400 of FIGS. 2, 3, 4 and 6 respectively, accessory gearboxes 108, 208, 308, 408 are each substituted by a respective dedicated radial drive. Such an arrangement is useful in cases where an accessory gearbox is unavailable for use within a cabin blower system, for example an accessory gearbox may not be present. In such a variant cabin blower system, mechanical power from a gas turbine engine is provided to the relevant transmission (110, 210, 310, 440) via a dedicated radial drive rather than via an accessory gearbox. In a starter mode, mechanical power is transmitted to the gas turbine engine via the dedicated radial drive rather than via an accessory gearbox.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

Although described with reference to an aircraft cabin blower, the technology disclosed herein could also be applicable to optimising the function of a turbocharger or supercharger of an industrial or marine diesel engine, for example. In such a case, the cabin blower compressor would be replaced by a turbocharger and the power source would be the diesel engine. The first and second electrical machines, power management system, and transmission would therefore remain in much the same form as described above. By coupling a diesel engine to a turbocharger using the technology of the present disclosure, the engine can run at optimum RPM whilst the speed of the turbocharger can be varied as desired.

The invention claimed is:

1. An aircraft cabin blower system comprising:
a cabin blower compressor configured to blow air;
a transmission configured to:
in a blower mode of operation, receive mechanical power in the form of a first transmission input and a second transmission input; and
in the blower mode of operation, transmit an output that drives the cabin blower compressor, in which a speed of the output of the transmission is based on a function of a speed of the first transmission input and a speed of the second transmission input; and
an electrical circuit including: a first electrical machine, a second electrical machine, and a power management system, wherein, when operating in the blower mod:
the transmission is configured to receive mechanical power from a gas turbine engine in the form of the first transmission input,
the first electrical machine is configured to: (i) receive mechanical power from the gas turbine engine independently of the transmission, and (ii) operate as a generator to provide electrical power to the power management system, and
the second electrical machine is configured to receive electrical power from the power management system and to operate as a motor providing mechanical power to the transmission in the form of the second transmission input.

2. The aircraft cabin blower system according to claim 1, wherein, when the aircraft cabin blower system operates in a starter mode, the first electrical machine is configured to operate as a motor to provide mechanical power to the gas turbine engine to facilitate starting of the gas turbine engine, the first electrical machine being driven by electrical power from the power management system.

3. The aircraft cabin blower system according to claim 2, wherein, when the aircraft cabin blower system operates in the starter mode, the second electrical machine is configured to receive mechanical power from the transmission and operate as a generator to provide electrical power to the power management system.

4. The aircraft cabin blower according to claim 3, wherein, when the aircraft cabin blower system operates in the starter mode, the transmission is configured to receive mechanical power from the cabin blower compressor operating as an expander, at least part of this mechanical power being provided to the second electrical machine.

5. The aircraft cabin blower system according to claim 2, wherein, when the aircraft cabin blower system operates in the starter mode, the second electrical machine is configured to operate as a motor to provide mechanical power to the gas turbine engine, the second electrical machine being driven by electrical power from the power management system.

6. The aircraft cabin blower system according to claim 2, wherein, in the starter mode, a gearbox-mounted electric generator of the gas turbine engine is configured to operate as a motor to provide additional mechanical power to the gas turbine engine to facilitate engine starting.

7. The aircraft cabin blower system according to claim 6, wherein the gearbox-mounted electric generator is configured to receive electrical power from the power management system.

8. The aircraft cabin blower system according to claim 1, the power management system including a storage device configured to store electrical power.

9. The aircraft cabin blower system according to claim 1, wherein
the power management system is configured to provide input power to one of the first electrical machine or the second electrical machine, the input power being provided at a different rate from an output power received by the power management system from the other of the first electrical machine and the second electrical machine.

10. The aircraft cabin blower system according to claim 9, wherein the ratio of the input power to the output power is variable.

11. The aircraft cabin blower system according to claim 10, wherein the ratio of the input power to the output power is continuously variable.

12. The aircraft cabin blower system according to claim 1, wherein the power management system is configured to receive power from an external power source.

13. The aircraft cabin blower system according to claim 12, wherein the external power source is at least one of a ground cart and an aircraft auxiliary power unit.

14. The aircraft cabin blower system according to claim 1, wherein the transmission includes an epicyclic gearbox.

15. The aircraft cabin blower system according to claim 1, further comprising:
a second transmission configured to provide any one of a plurality of discrete gear ratios, the aircraft cabin blower system being arranged for at least one of:
(a) transmission of mechanical power from the gas turbine engine to the first transmission input and the first electrical machine via the second transmission in the blower mode of the system; and
(b) transmission of mechanical power from the first transmission input and the first electrical machine to the gas turbine engine via the second transmission in a starter mode of the system.

16. The aircraft cabin blower system according to claim 1, further comprising:
an auxiliary gearbox or a dedicated radial drive arranged to transmit mechanical power from the gas turbine engine to the first transmission input and the first electrical machine or to the second transmission input and the second electrical machine, in the blower mode of the system, and from the first transmission input and the first electrical machine or to the second transmission input and the second electrical machine, to the gas turbine engine in a starter mode of the system.

17. An aircraft comprising an aircraft cabin blower system according to claim 1.

18. A method of operating an aircraft cabin blower system including: (a) a transmission configured to receive mechanical power in the form of a first transmission input and a second transmission input, and (b) an electrical circuit including a first electrical machine, a second electrical machine, and a power management system, the method comprising:
when the aircraft cabin blower system operates in a blower mode:
providing mechanical power from a gas turbine engine to the transmission via the first transmission input;
providing mechanical power from the gas turbine engine to the first electrical machine independently of the transmission such that the first electrical machine operates as a generator, the first electrical machine providing electrical power to the power management system; and
providing electrical power from the power management system to the second electrical machine such that the second electrical machine operates as a motor, the second electrical machine providing mechanical power to the transmission via the second transmission input, wherein:
a speed of the output of the transmission is determined by a function of the speeds of the first and second transmission inputs.

19. The method according to claim 18, further comprising:
when the aircraft cabin blower system operates in a starter mode:
providing electrical power from the power management system to the first electrical machine such that the first electrical machine operates as a motor, the first electrical machine providing mechanical power to the gas turbine engine in order to facilitate starting of the gas turbine engine.

20. The method according to claim 19, further comprising the steps of:
when the aircraft cabin blower system operates in the starter mode:
providing mechanical power from the transmission to the second electrical machine such that the second electrical machine operates as a generator, the second electrical machine providing electrical power to the power management system.

21. The method according to claim 19, further comprising the steps of:
when the aircraft cabin blower system operates in the starter mode:
providing electrical power from the power management system to the second electrical machine such that the second electrical machine operates as a motor, the second electrical machine providing mechanical power to the gas turbine engine to facilitate starting of the gas turbine engine.

22. The method according to claim 18, wherein mechanical power is transmitted from the gas turbine engine to the first transmission input and the first electrical machine via a second transmission in the blower mode, mechanical power is transmitted from the first transmission input and the first electrical machine to the gas turbine engine via the second transmission in a starter mode, and the second transmission is configured to provide any one of a plurality of discrete gear ratios.

\* \* \* \* \*